US010899368B2

(12) United States Patent
Schmidt et al.

(10) Patent No.: US 10,899,368 B2
(45) Date of Patent: Jan. 26, 2021

(54) METHOD FOR PRODUCING DIFFERENT VARIANTS OF RAILS FROM AN ASSEMBLY SET, AND SYSTEM HAVING A VEHICLE WHICH IS MOVABLE ON A RAIL COMPONENT

(71) Applicant: SEW-EURODRIVE GMBH & CO. KG, Bruchsal (DE)

(72) Inventors: Josef Schmidt, Graben-Neudorf (DE); Ralf Berger, Stutensee (DE); Markus Thome, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 297 days.

(21) Appl. No.: 15/902,375

(22) Filed: Feb. 22, 2018

(65) Prior Publication Data

US 2018/0178815 A1    Jun. 28, 2018

Related U.S. Application Data

(62) Division of application No. 13/884,731, filed as application No. PCT/EP2011/005566 on Nov. 4, 2011, now Pat. No. 9,932,047.

(30) Foreign Application Priority Data

Nov. 10, 2010    (DE) .................. 10 2010 050 760

(51) Int. Cl.
*B61B 13/00* (2006.01)
*B60M 1/30* (2006.01)
(Continued)

(52) U.S. Cl.
CPC .............. *B61B 13/00* (2013.01); *B60L 13/03* (2013.01); *B60M 1/307* (2013.01); *B61B 3/02* (2013.01);
(Continued)

(58) Field of Classification Search
CPC ...... B60L 5/005; B60L 2200/26; B60L 13/03; B61B 3/02; B61B 13/00; B61B 13/04;
(Continued)

(56) References Cited

U.S. PATENT DOCUMENTS

| 4,385,652 A | 5/1983 | Frank |
| 4,520,733 A * | 6/1985 | Willmann ............... E01B 25/24 104/110 |

(Continued)

FOREIGN PATENT DOCUMENTS

| CN | 101378931 A | 3/2009 |
| CN | 101765532 A | 6/2010 |

(Continued)

OTHER PUBLICATIONS

International Search Report and Written Opinion, dated Mar. 14, 2012, in International Application No. PCT/EP2011/005566.

(Continued)

*Primary Examiner* — Zachary L Kuhfuss
(74) *Attorney, Agent, or Firm* — Carter Deluca & Farrell LLP

(57) ABSTRACT

In a method for producing different rail variants from an assembly set, and system having a vehicle which is movable on a rail part, the assembly set includes a rail profile part and two different reactive components, and the rail profile part includes an interface at which one of the different reactive components is optionally able to be connected.

21 Claims, 4 Drawing Sheets

(51) Int. Cl.
*E01B 25/10* (2006.01)
*E01B 25/04* (2006.01)
*E01B 25/24* (2006.01)
*E01B 25/22* (2006.01)
*B61B 3/02* (2006.01)
*B60L 13/03* (2006.01)
*B61B 13/04* (2006.01)

(52) U.S. Cl.
CPC .............. *B61B 13/04* (2013.01); *E01B 25/04* (2013.01); *E01B 25/10* (2013.01); *E01B 25/22* (2013.01); *E01B 25/24* (2013.01)

(58) Field of Classification Search
CPC .......... E01B 25/22; E01B 25/04; E01B 25/10; E01B 25/24; B60M 1/307
See application file for complete search history.

(56) References Cited

U.S. PATENT DOCUMENTS

| | | | |
|---|---|---|---|
| 4,860,662 A | | 8/1989 | Matsumoto et al. |
| 6,216,601 B1* | | 4/2001 | Zacharias ................ B66C 7/16 104/249 |
| 6,978,873 B2 | | 12/2005 | Ishioka |
| 7,204,192 B2 | | 4/2007 | Lamb et al. |
| 9,932,047 B2* | | 4/2018 | Schmidt .................. E01B 25/10 |
| 2009/0013899 A1 | | 1/2009 | Wolf et al. |
| 2013/0233934 A1* | | 9/2013 | Schmidt .................. E01B 25/10 238/122 |
| 2018/0178815 A1* | | 6/2018 | Schmidt .................. E01B 25/10 |

FOREIGN PATENT DOCUMENTS

| | | |
|---|---|---|
| DE | 602 102 C | 8/1934 |
| DE | 43 45 105 A1 | 7/1994 |
| DE | 10 2004 008 571 A1 | 10/2005 |
| DE | 10 2004 049 982 A1 | 3/2006 |
| DE | 10 2005 054 252 A1 | 5/2007 |
| DE | 10 2006 049 588 A1 | 8/2007 |
| DE | 10 2006 059 887 A1 | 7/2008 |
| DE | 10 2008 005 385 A1 | 1/2009 |
| DE | 10 2010 048 586 A1 | 7/2011 |
| EP | 0 030 647 A1 | 6/1981 |
| FR | 2 579 640 A2 | 10/1986 |
| GB | 863182 A | 3/1961 |
| JP | H02-83602 U | 6/1990 |
| JP | H03-107426 U | 11/1991 |
| JP | H05-32312 A | 2/1993 |
| JP | H05-33301 A | 2/1993 |
| JP | H11-503798 A | 3/1999 |
| WO | 95/18889 A1 | 7/1995 |

OTHER PUBLICATIONS

International Preliminary Report on Patentability, dated May 23, 2013, in International Application No. PCT/EP2011/005566.

* cited by examiner

METHOD FOR PRODUCING DIFFERENT VARIANTS OF RAILS FROM AN ASSEMBLY SET, AND SYSTEM HAVING A VEHICLE WHICH IS MOVABLE ON A RAIL COMPONENT

CROSS-REFERENCE TO RELATED APPLICATIONS

The present application is a divisional of U.S. patent application Ser. No. 13/884,731, filed on May 10, 2013, which is the national stage entry of International Application No. PCT/EP2011/005566, filed on Nov. 4, 2011, which claims priority to German Patent Application No. 10 2010 050 760.1, filed on Nov. 10, 2010, each of which is incorporated herein in its entirety by reference thereto.

FIELD OF THE INVENTION

The present invention relates to a method for producing different variants of rails from an assembly set, and to a system having a vehicle which is movable on a rail part.

BACKGROUND INFORMATION

The production of rails made of steel for public transportation systems, such as railways, tramways or the like, is known.

SUMMARY

Example embodiments of the present invention provide a rail-based transport system, which is able to be produced in the most-effective production possible.

Among features of example embodiments of the present invention in the method for producing different variants of rails, especially monorail rails or monorail suspended railroad rails, from an assembly set are that the assembly set includes a rail profile part and two different reactive components, the rail profile part having an interface to which one of the different reactive components is optionally able to be connected.

This has the advantage of providing an implementation in two pieces. Depending on the used electromotive drive of the vehicle, i.e., a linear eddy current motor, an asynchronous motor, a synchronous motor, a reluctance motor, etc., a correspondingly acting reactive component is therefore able to be mounted on the rail in integrated fashion.

The rail profile part may be provided with drilling aids, especially drilling grooves, for forming the interface, in particular as drilling aid when introducing bores, a first drilling aid for joining the reactive component being used in producing a first variant, especially for introducing a bore for a screw that connects the reactive component and the rail profile part, another drilling aid for joining the reactive component being used for producing another variant, especially for introducing a bore for a screw that connects the reactive component and the rail profile part. This has the advantage that depending on the selected rail part, and thus depending on the rail part to be produced, a bore that is appropriately situated at different locations is able to be introduced into the rail profile part in an uncomplicated manner. This makes it possible to connect reactive components, which are able to be joined by connecting screws disposed in centered or eccentric manner, and which therefore function according to different action mechanisms in each case. In particular it is also possible to use a gear rack as reactive component, so that a linear geared motor is able to be provided, in which a gear tooth component of the geared motor, driven by an electric motor of the geared motor, is in engagement with the gear rack.

A blade of a linear asynchronous motor or of an eddy current motor may be used as reactive component, or a holding part, accommodating permanent magnets, of a synchronous linear motor, or a reactive component of a reluctance motor or a gear rack. This has the advantage that different modes of action are realizable in the linear drive of the vehicle. In particular retrofitting of an existing system, from one operating principle to another operating principle, is able to be accomplished in a simple and rapid manner.

Among features in the system having a vehicle which is movable on a rail part, the rail part having a rail profile part, and
the rail profile component having a plurality of drilling aids disposed at a distance from each other. This has the advantage that depending on the desired arrangement, i.e., depending on the reactive component, bores are able to be introduced into the rail profile part in a simple, rapid and highly precise manner. This then makes it possible to produce a high number of rail variants using a small number of parts in the assembly set in the model line.

The rail profile part may be produced as a continuous casting component, especially including the drilling aids, the rail profile part being made of aluminum, in particular. This is advantageous insofar as no additional work is required to produce the drilling grooves.

A recess for conveying a cooling medium such as air, pressurized air, water, oil or hydraulic oil, may be situated in the rail profile part. This has the advantage, for example, that rail profile parts heated by eddy currents are able to be cooled by the cooling medium. The recesses may be arranged such that they improve the stability of the rail profile part. For this purpose they have a circular cross-section, for example.

The rail profile part may have at least one running surface for a wheel of a vehicle. This has the advantage that multiple functionalities are able to be realized by the rail, such as a running surface for the wheel and guide wheel, as well as a reactive component, a data transmission by hollow conductors and slotted hollow conductors, and/or the conveyance of a cooling medium through a cooling duct.

The drilling aids may be implemented in the form of grooves, especially drilling grooves, extending in the rail direction, parallel to each other, drilling grooves in particular being situated on the top side, and additional drilling grooves being situated on a side surface, so that a primary conductor is able to be threaded through a bore introduced into the drilling groove. This is advantageous inasmuch as a bore is able to be introduced in an uncomplicated manner at a predefinable rail position, so that a cable can be threaded through from the side surface of the rail profile part facing the vehicle to the side of the rail profile part facing away from the vehicle.

The rail profile may have a recess which is used as hollow conductor, as well as a recess which is used as slotted hollow conductor, an antenna for inputting or outputting electromagnetic radiation into the hollow conductor, and an antenna for inputting or outputting electromagnetic radiation into the slotted hollow conductor being provided, and the vehicle having an antenna for inputting or outputting electromagnetic radiation into the slotted hollow conductor.

This has the advantage that the slotted hollow conductor may be used to transmit data from the vehicle to the nearest infeed, from where the data intended for other devices, e.g., other infeeds or a central computer, are able to be transmitted further via the hollow conductor.

The frequency of the electromagnetic waves input into the hollow conductor may differ by less than the factor of two from the frequency of electromagnetic waves input into the slotted hollow conductor. This has the advantage that a substantially similar frequency range may be used, so that the recesses in the slotted hollow conductor profile roughly have a similar size. This makes it possible to achieve high stability of the rail profile part through a suitable placement of the recesses.

A bore may be introduced at a first drilling aid, where a first reactive component is joined by a screwed connection, and a drilling aid set apart from the first drilling aid is situated on the rail profile component without being used, to be utilized especially for a screwed connection with a reactive component that differs from the first reactive component. This is advantageous inasmuch as different variants are able to be produced using parts that differ only slightly, i.e., from a small assembly set of parts.

The drilling aids may be situated in a groove, especially at the base of the groove. This has the advantage that the groove walls are able to be used for centering and as lateral delimitation.

The groove may be introduced into a running surface. This has the advantage that the vehicle is able to be supported on the running surface on both sides of the groove, by wheels.

Additional recesses, which are usable as hollow conductors may be disposed in the rail profile part, whose dimensions are so small that a frequency must be used that is at least twice as high as in the case of the slotted hollow conductor. This has the advantage of providing additional data transmission channels.

A receiver may be provided on the rail profile part, on which a holding device is affixable, especially a plastic profile part, which accommodates a primary conductor, into which a medium frequency alternating current is able to be impressed, especially at a frequency between 10 and 500 kHz; as a result, a secondary winding disposed on the vehicle is inductively coupled to the primary conductor, which is installed in elongated form in the rail direction, a capacity being connected to the secondary winding in series or in parallel, such that the associated resonant frequency substantially corresponds to the frequency of the alternating current input into the primary conductor. This is advantageous insofar as it allows for a contactless energy transmission to the vehicle. However, eddy currents are produced in metallic parts in the process, which lead to heating. For cooling purposes, cooling channels which conduct a cooling medium are provided in the rail profile part.

Example embodiments of the present invention are explained in greater detail below with reference to the appended Figures.

DETAILED DESCRIPTION

Figure 1:
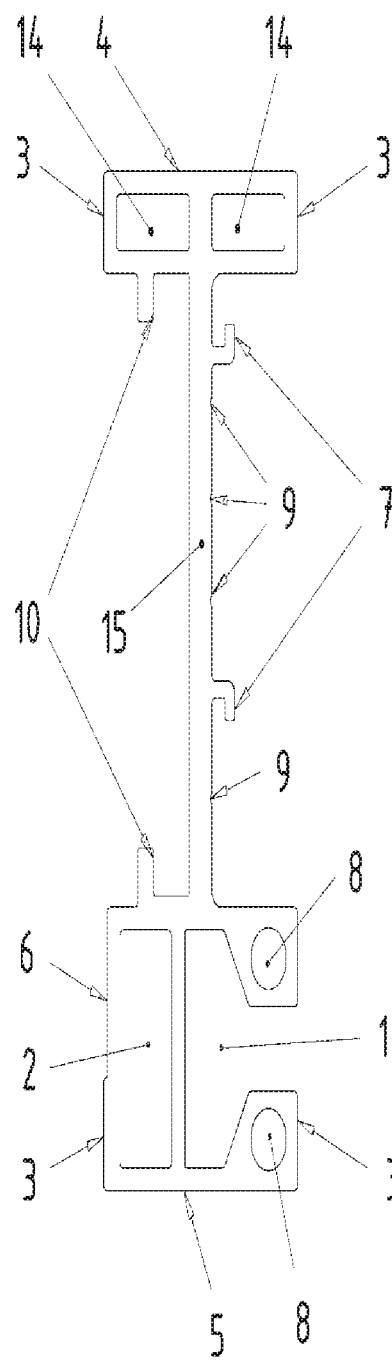
FIG. 1 shows an OMR (overhead monorail rail) rail according to an example embodiment of the present invention, in cross-section, the opening of a slotted hollow conductor 1 having been introduced on the side.

FIG. 1 shows the profile of the OMR rail produced by a continuous casting process. Recesses are provided in the continuous casting profile, which extend in the continuous casting direction without interruption.

Two separate recesses 14, which are usable as cavities for conducting electromagnetic waves, are situated in the upper part of the OMR rail. As a result, recesses 14 are optionally usable as hollow conductors.

Running surfaces for wheels are situated on the outer sides, especially at the top side and the side walls of the wall surrounding recesses 14. On the top side, a running surface 4 is provided for load-bearing wheels, which substantially introduces the weight force of the rail vehicle into this running surface 4 on the top side. The force must be transmitted through the rail profile, up to its suspension, where the force is then shunted to the suspension.

Running surfaces 3 for guide wheels of the rail vehicle are provided on the side surfaces of the wall. As a result, the vehicle is laterally guidable along the rail.

The wall including recesses 14 is connected via rail wall 15 to another section of the profile, which in turn includes a recess 2 having a closed cross-section, which is used as hollow conductor. In addition, a recess 1 is implemented, which is open toward the side and is able to be used as slotted hollow conductor. This therefore produces a rail in one piece, which not only allows the weight force of the vehicle and the lateral guidance of the vehicle, but also the conducting of waves. A cavity, which is closed in profile, is used as hollow conductor 2, and a cavity, which is laterally open in profile is used, which is provided as a slotted hollow conductor 1. The vehicle guides an antenna for the transmission and reception of electromagnetic waves along the slot area, so that an uninterrupted data exchange is possible while the vehicle is moving. For while it is true that the waves input into slotted hollow conductor 1 propagate along the rail, a portion exits at the slot and thus is usable for the data reception. Conversely, a portion of the electromagnetic radiation emitted from the antenna is input into slotted hollow conductor 1, so that it is able to convey the radiation along the rail direction. The coupling device for the incoupling or outcoupling of the electromagnetic radiation is not shown in the figures.

Mounting device 10, especially a suspension device, is provided on the wall surrounding recesses 14 and in the section connected via rail wall 15. In this manner, mounting device 10 may be used to fix the OMR rail in place on a hall wall or on T-carriers of a system, especially in detachable manner. This allows a rapid and simple exchange. In so doing, the entire rail is exchanged, that is to say, both the mechanically bearing part and the part acting as the electromagnetically conductive hollow conductor.

Receivers 7 for top hat rails, especially top hat rail mounting devices, are also situated on a side surface of rail wall 15, so that a top hat rail is able to be affixed, which allows the realization of additional functionalities.

Furthermore, recesses are also provided in the rail profile, which are able to be used as duct 8, especially as pressurized air duct or hydraulics duct. It is therefore possible to route pressurized air or hydraulic pressure through in the rail direction, so that heat from the rail profile is able to be dissipated. Since strong alternating magnetic fields emanate from the primary conductor, eddy currents are induced in the rail profile, which lead to heating of the rail profile. By forming the rail profile from metal, especially aluminum, the heat is dissipated to the pressurized air duct or hydraulics duct in an especially satisfactory manner. As a result, even plastic-shielded wheels or plastic wheels are usable as running wheels and/or guide wheels, i.e., a material pairing of metal of the rail and plastic is able to be used on the running surface. This results in an especially quiet operation of the vehicle.

Running surfaces 3 for side wheels are also provided in the lower section on the side, and a running surface 5 for additional guide wheels is provided on the underside.

A mounting surface 6 for identification devices or codes, in particular bar codes or pickup masks, is provided on rail wall 15. Using a sensor disposed on the vehicle it is therefore possible to read the coding and to determine information for the current position of the vehicle on that basis. This determination takes place with the aid of an electronic circuit in the vehicle, which is electrically connected to the sensor and thus processes the information detected by the sensor.

Drilling grooves 9 provide a drilling aid, especially already during the continuous casting process. The bores are therefore easy to introduce into rail wall 15 and thus allow electronic modules to be screw-mounted as well. In addition, such a bore may be used for the through-feeding of a primary conductor cable. This primary conductor preferably is clipped into a plastic profile, which is connected at hat rail mounting system 7 in form-locking and/or force-locking manner, especially latched.

Figure 2:
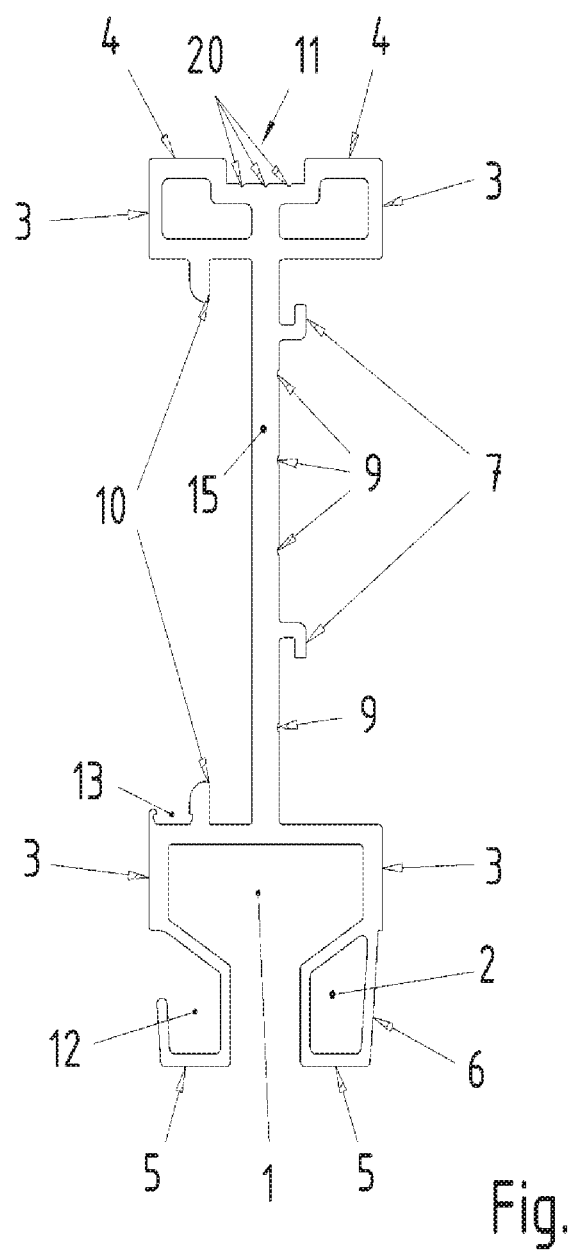
FIG. 2 shows another OMR (overhead monorail rail) rail according to an example embodiment of the present invention, in cross-section, the opening of a slotted hollow conductor 1 having been introduced at the bottom.
Figure 3:
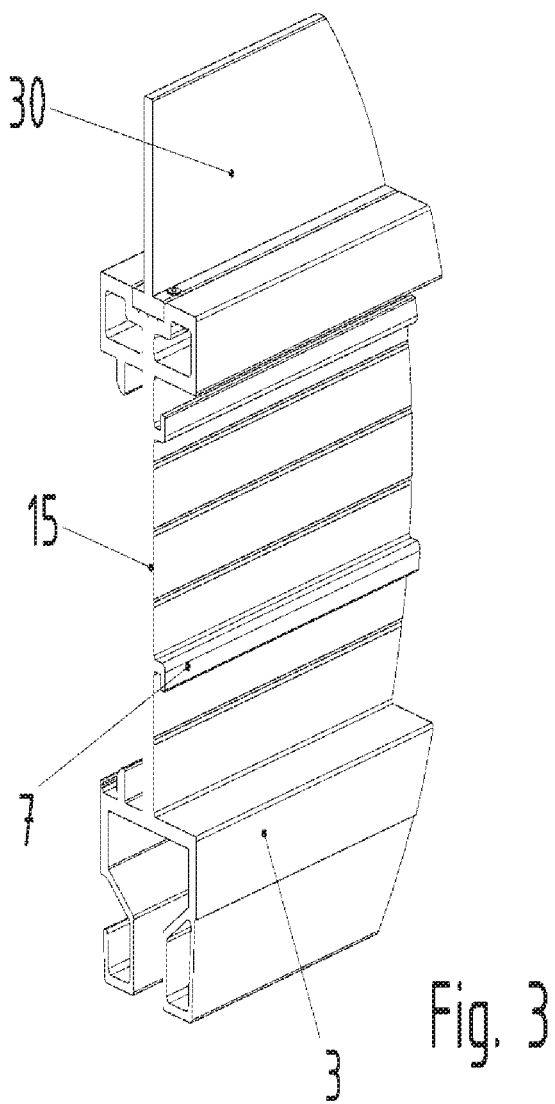
FIG. 3 shows the oblique view associated with FIG. 2, in which a blade is joined to the rail in detachable manner.

In the arrangement shown in FIG. 2, an adapter notch 11 for additional components is introduced in the top side. As illustrated in FIG. 3, a blade 30 may be provided, which either is arranged as stationary part of a linear asynchronous motor, in which case the vehicle has a stator including a three-phase winding which is interacting with the blade as corresponding to the short-circuit cage, in order to generate a a feed force in the rail direction. As an alternative, the vehicle has a magnet wheel drive as eddy current drive, in which a system of permanent magnets is able to be set in rotary motion by an electric motor, so that these permanent magnets rotate past blade 30 and thereby generate eddy currents therein, so that the feed force in the rail direction is able to be generated in this manner.

Using gear rack 40 shown in FIG. 3, even large gradients of the system are able to be overcome in that the vehicle has a gear wheel whose teeth are able to be brought into engagement with the gearing of the gear rack, so that free spinning of drive wheels is avoidable, especially also at high gradients, i.e., high downhill output forces.

As can be gathered from FIG. 3, the rail profile is arranged such that an integrated cable duct 12 is produced, so that cables may be inserted and thus are easily installable in the rail direction.

In addition, an adapter notch 13 for a snap-on cable duct or additional components is provided on the profile, especially in the lower section of the profile. As a result, a holding device is able to be inserted, which, for instance, accommodates and holds a primary conductor, which is able to be at least partially enveloped by a coil core of a secondary winding disposed on the vehicle, and thus may be coupled thereto in inductive manner.

Infeeds are provided for each path section within the system. These infeeds impress a medium frequency alternating current, especially at a frequency between 10 and 500 kHz, into an elongated line conductor, which is installed in the rail direction and thus is able to be inductively coupled to a secondary winding provided on the vehicle. A capacity is connected in series or parallel to the secondary winding, such that the associated resonant frequency substantially corresponds to the impressed alternating current frequency, which makes it possible to achieve high efficiency in the contactless energy transmission from the primary conductor to the secondary winding of the vehicle.

Slotted hollow conductors 1 and hollow conductors 2 are used in different manners. As described earlier, a data exchange takes place between the vehicle and the slotted hollow conductors, so that the data are then able to be forwarded in the slotted hollow conductor as far as an antenna projecting into the slotted hollow conductor.

Preferably, this antenna is placed in an infeed region of the primary current. In this region a slot is machined into the rail part, into which a plate is slipped, so that hollow conductor 2 is subdivided into a front and rear half-space. Accordingly, a separate antenna is provided in front of and behind the plate for the incoupling or outcoupling of electromagnetic waves. The signals of the antennas are supplied to a separate data transmission device, which is situated in the infeed region in each case.

Slotted hollow conductor 1 is used to provide a stable, shielded radio connection for the movable, track-guided vehicles. In other words, the linking of a vehicle to the slotted hollow conductor takes place via a mobile vehicle coupler, i.e., an antenna guided along the slot of the slotted hollow conductor. This allows for a contactless mobile data transmission.

Closed hollow conductor 2 is used for the steady-state backbone communication. In this case, both the transmitter and receiver are at a fixed location and cannot be moved. The hollow conductor is closed between the transmission and reception position, and no signal connection, i.e., signal incoupling or signal outcoupling, is able to take place in-between. This therefore realizes a stationary data transmission as in the case of a cable link using a coaxial cable.

In this context, it is important that each path section is assigned an electrical system that may be called an infeed, which is provided not only as power supply into the primary conductor for a contactless power supply of the vehicle, but which is also used for the incoupling or outcoupling of signals for data-transmission purposes. In so doing, the signals are coupled into hollow conductor 2 and/or into recesses 14, which are usable as hollow conductors. This allows for a data transmission to all infeeds or to a central control since all infeeds and possibly also the central control have antennas for the data exchange with hollow conductor 2 or recesses 14, the antennas correspondingly projecting into the hollow conductor or the recesses.

Using the slotted hollow conductor, data are able to be exchanged between the vehicle and the particular infeed that is connected to an antenna projecting into the slotted hollow conductor 1 in the particular path section assigned to the infeed.

Although the signals are coupled into slotted hollow conductor 1 and hollow conductor 2, or into recesses 14, at frequencies from the frequency range between 4 and 8 GHz, damping in slotted hollow conductor 1 in the rail direction is greater, however, so that a lower data-transmission rate and/or range are/is able to be realized as a consequence.

Damping inside hollow conductor 1 and/or recesses 14 is lower, so that the data transmission is able to take place at a high rate.

The infeed also includes a converter, which forwards the particular data that are not to be exchanged between the vehicle and the infeed assigned to the slotted hollow conductor of the path section, to hollow conductor 2 or removes the data therefrom.

As shown in FIG. 2, adapter notch 11 is provided with a drilling groove disposed in centered manner inside the notch, as well as with two additional drilling grooves 20, so that at least one drilling groove 20 is situated on both sides of the centered drilling groove, these drilling grooves then being disposed off-center in particular. Symmetrical spacing in relation to centered drilling groove 20 is advantageous in this context.

The drilling grooves are elongated in the rail direction; in other words, they are introduced by the continuous casting tool during the continuous casting process.

This makes it easy to introduce a bore in the region of the drilling groove, since the drill tool does not slip sideways when placing the drilling tool. The bore surrounds drilling groove 20 when finished.

Figure 4:
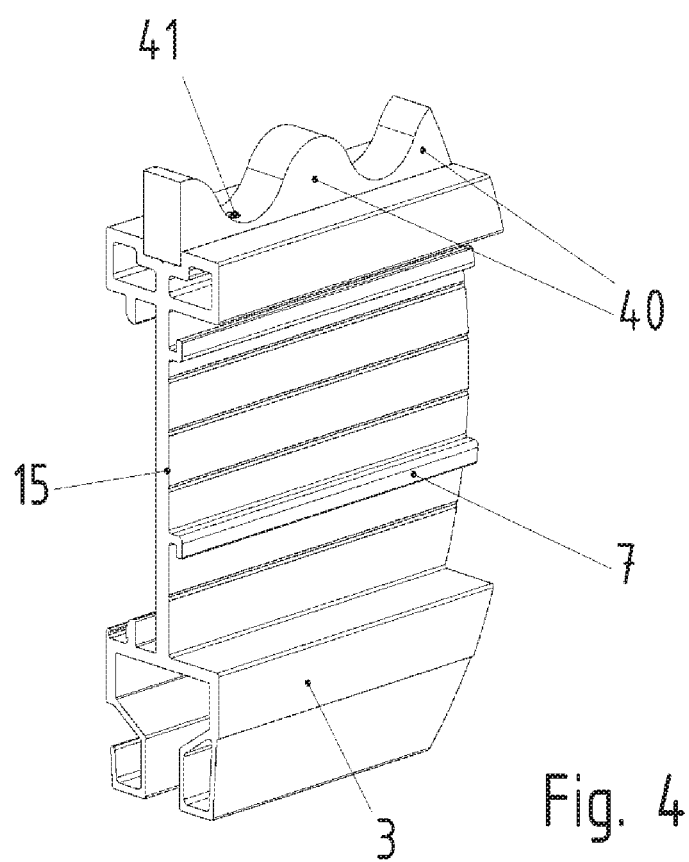
FIG. 4 shows the oblique view associated with FIG. 2, in which a gear rack is joined to the rail in detachable manner.

A configuration according to FIG. 3 or according to FIG. 4 is optionally possible in the production. The advantageously placed bores are introduced into the profile part at the appropriate drilling grooves.

When opting for the implementation according to FIG. 3, two bores are used in eccentric grooves 20, so that blade 30 is screw-fitted on both sides with the profile part in its widened region disposed in the groove base.

If the implementation according to FIG. 4 is selected, a bore in centered groove 20 is used, so that gear rack 40 is screw-fitted with the profile part in centered manner, the screwed connection in particular being disposed inside a depression of gear rack 40, i.e., at a location with the lowest wall thickness possible.

As a result, an assembly which includes the profile part, the gear rack and the blade is able to be provided. Using this assembly set, it is then optionally possible to produce a variant including the blade or, alternatively, the gear rack. A high number of variants is therefore able to be produced using a low number of parts. This therefore makes it possible to produce a model line of different rail profiles from the assembly set.

Additional drilling grooves preferably are likewise implemented in parallel in the rail direction and provided in the adapter notch, thereby making it possible to provide additional screwed connections at other distances from the centrically disposed drilling groove.

In other exemplary embodiments according to the present invention, it is not only the blade or the gear rack that are accommodated, but also additional reactive components such as a holding part accommodating permanent magnets for forming a synchronous linear motor, or a reactive component of a linear reluctance motor.

In additional exemplary embodiments according to the present invention, a non-centered drilling groove is provided instead of the centered drilling groove.

LIST OF REFERENCE NUMERALS

1 slotted hollow conductor
2 hollow conductor
3 running surface for side wheels
4 running surface for load-bearing wheels
5 running surface for additional guide wheels
6 mounting surface for identification means or codings, especially bar codes or pickoff mask
7 receiver for top hat rails, especially top hat rail mounting means
8 duct, especially pressurized air duct or hydraulics duct
9 drilling grooves
10 mounting device, especially suspension device
11 adapter notch for additional components
12 integrated cable duct
13 adaptation groove for plug-in cable duct or further components
14 recess, especially usable as hollow conductor
15 rail wall
20 drilling grooves
30 blade, especially aluminum blade
40 gear rack
41 screw, screw-fitted in the region of the centerrf drilling groove

The invention claimed is:

1. A system, comprising:
a vehicle movable on a rail part, the rail part being provided with a rail profile part, wherein the rail profile part has a plurality of drilling aids disposed at a distance from each other;
wherein the drilling aids are arranged as grooves, and/or drilling grooves, extending in a rail direction, parallel to each other, drilling grooves being situated on a top side, and additional drilling grooves on a side surface, so that a primary conductor is threadable through a bore provided in the drilling groove.

2. The system according to claim 1, wherein the rail profile part is arranged as a continuous cast component, including the drilling aids, the rail profile part being made of aluminum.

3. The system according to claim 1, wherein a recess for conveying a cooling medium, air, pressurized air, water, oil, and or hydraulic oil is situated in the rail profile part.

4. The system according to claim 1, further comprising at least one running surface for a wheel of a vehicle.

5. The system according to claim 1, wherein the rail profile part has a recess which is used as hollow conductor, and a recess which is used as slotted hollow conductor, an antenna for inputting and/or outputting electromagnetic radiation into the hollow conductor, the system further comprising an antenna for inputting and/or outputting electromagnetic radiation into the slotted hollow conductor, and the vehicle having an antenna for inputting and/or outputting electromagnetic radiation into the slotted hollow conductor.

6. The system according to claim 1, wherein a frequency of electromagnetic waves input into a hollow conductor differs by less than a factor of two from a frequency of electromagnetic waves input into a slotted hollow conductor.

7. The system according to claim 1, wherein additional recesses which are usable as hollow conductors are disposed in the rail profile part, dimensions being so small that a frequency must be used that is at least twice as high than that for a slotted hollow conductor.

8. A system, comprising:
a vehicle movable on a rail part, the rail part being provided with a rail profile part, wherein the rail profile part has a plurality of drilling aids disposed at a distance from each other;
wherein a bore is arranged at a first drilling aid, where a first reactive component is joined using a screwed connection, and a drilling aid set apart from the first drilling aid is situated on the rail profile part unused, to be used in a screwed connection with a reactive component that differs from the first reactive component.

9. The system according to claim 8, wherein the drilling aids are situated in a groove and/or at a base of a groove.

10. The system according to claim 9, wherein the groove is arranged in a running surface.

11. The system according to claim 8, wherein the rail profile part is arranged as a continuous cast component, including the drilling aids, the rail profile part being made of aluminum.

12. The system according to claim 8, wherein a recess for conveying a cooling medium, air, pressurized air, water, oil, and or hydraulic oil is situated in the rail profile part.

13. The system according to claim 8, further comprising at least one running surface for a wheel of a vehicle.

14. The system according to claim 8, wherein additional recesses which are usable as hollow conductors are disposed in the rail profile part, dimensions being so small that a frequency must be used that is at least twice as high than that for a slotted hollow conductor.

15. A system, comprising:
a vehicle movable on a rail part, the rail part being provided with a rail profile part, wherein the rail profile part has a plurality of drilling aids disposed at a distance from each other; and
a receiver arranged on the rail profile part, where a holding device and/or a plastic profile part, accommodating a primary conductor is fixable, into which a medium frequency alternating current is able to be impressed, at a frequency between 10 and 500 kHz, so that a secondary winding disposed on the vehicle is inductively coupled to the primary conductor, which is installed in elongated form in a rail direction, and a capacity is connected to the secondary winding, in series or in parallel, such that an associated resonant frequency substantially corresponds to a frequency of an alternating current input into the primary conductor.

16. The system according to claim 15, wherein the rail profile part is arranged as a continuous cast component, including the drilling aids, the rail profile part being made of aluminum.

17. The system according to claim 15, wherein a recess for conveying a cooling medium, air, pressurized air, water, oil, and or hydraulic oil is situated in the rail profile part.

18. The system according to claim 15, further comprising at least one running surface for a wheel of a vehicle.

19. The system according to claim 15, wherein additional recesses which are usable as hollow conductors are disposed in the rail profile part, dimensions being so small that a frequency must be used that is at least twice as high than that for a slotted hollow conductor.

20. The system according to claim 15, wherein the drilling aids are situated in a groove and/or at a base of a groove.

21. The system according to claim 20, wherein the groove is arranged in a running surface.

* * * * *